US011455099B1

(12) United States Patent
Dumitru et al.

(10) Patent No.: US 11,455,099 B1
(45) Date of Patent: Sep. 27, 2022

(54) FAST BLOCK DEVICE, SYSTEM AND METHODOLOGY

(71) Applicants: Douglas Dumitru, Laguna Hills, CA (US); Samuel J. Anderson, Wallingford, PA (US)

(72) Inventors: Douglas Dumitru, Laguna Hills, CA (US); Samuel J. Anderson, Wallingford, PA (US)

( * ) Notice: Subject to any disclaimer, the term of this patent is extended or adjusted under 35 U.S.C. 154(b) by 56 days.

(21) Appl. No.: 17/079,031

(22) Filed: Oct. 23, 2020

Related U.S. Application Data

(63) Continuation of application No. 15/396,904, filed on Jan. 3, 2017, now Pat. No. 10,817,185, which is a continuation-in-part of application No. 14/809,263, filed on Jul. 26, 2015, now Pat. No. 9,535,830, which is a continuation of application No. 14/462,457, filed on Aug. 18, 2014, now Pat. No. 9,092,325, which is a continuation of application No. 13/769,455, filed on Feb. 18, 2013, now Pat. No. 8,812,778, which is a continuation of application No. 12/041,509, filed on Mar. 3, 2008, now Pat. No. 8,380,944.

(60) Provisional application No. 62/327,012, filed on Apr. 25, 2016, provisional application No. 60/909,903, filed on Apr. 3, 2007, provisional application No. 60/892,517, filed on Mar. 1, 2007.

(51) Int. Cl.
*G06F 3/06* (2006.01)

(52) U.S. Cl.
CPC ............ *G06F 3/0616* (2013.01); *G06F 3/064* (2013.01); *G06F 3/068* (2013.01); *G06F 3/0649* (2013.01); *G06F 3/0653* (2013.01); *G06F 3/0656* (2013.01); *G06F 3/0659* (2013.01); *G06F 3/0674* (2013.01); *G06F 3/0679* (2013.01)

(58) Field of Classification Search
CPC ...... G06F 3/0616; G06F 3/064; G06F 3/0649; G06F 3/0653; G06F 3/0656; G06F 3/0659; G06F 3/0674; G06F 3/0679; G06F 3/068; G06F 12/00; G06F 13/00
See application file for complete search history.

(56) References Cited

U.S. PATENT DOCUMENTS

| | | | | |
|---|---|---|---|---|
| 2003/0212752 | A1* | 11/2003 | Thunquest | G06F 16/10 709/213 |
| 2006/0193607 | A1* | 8/2006 | Veugen | G11B 27/034 |
| 2008/0005468 | A1* | 1/2008 | Faibish | G06F 3/0622 711/170 |
| 2013/0166855 | A1* | 6/2013 | Batwara | G06F 3/0659 711/154 |

* cited by examiner

*Primary Examiner* — Tuan V Thai
(74) *Attorney, Agent, or Firm* — Raymond Van Dyke; Van Dyke Intellectual Property Law

(57) ABSTRACT

A device, memory, method and system directed to fast data storage on a block storage device that reduces operational wear on the device. New data is written to an empty write block with a number of write blocks being reused. A location of the new data is tracked. Metadata associated with the new data is written. A lookup table may be updated based in part on the metadata. The new data may be read based the lookup table configured to map a logical address to a physical address.

6 Claims, 9 Drawing Sheets

Read Device Header Record:

802 — Initialize Tables to Empty

804 — Loop Through Each Write Block

806 — Loop Within a Write Block until the end of the Write Block

808 — Read Meta Header at beginning of address array

810 — If ( Header Invalid ) skip to next Write Block (go 836)

812 — Calculate size and location of rest of Address Array and Meta Footer (2$^{nd}$ half)

814 — Read rest of Address Array and Meta Footer

816 — If ( Meta Footer does not match Meta Header) skip to next write block (go 836)

818 — Loop through each address in Meta Array

820 — Lookup Address in LBA table (See Figure 5)

822 — If ( Address Exists ) then

824 — If ( Existing Address is newer ) then skip to next Address (go 832)

826 — Remove existing address

827 — Decrement fill counters for existing write block.

828 — End If

830(831) — Update LBA with new address and increment fill counters for this block.

832 — Repeat loop 820 for all address in address array

834 — Repeat loop 818 until end of write block reached.

836 — Repeat loop 804 for all write blocks.

FIG. 8B

Write

1002 — If ( no space in current Write block ) gosub WritePush

1004 — Test if block cleared

1006 — Add block address to write array

1008 — if ( block not cleared ) copy block data to write buffer

Write Push

1010 — Build write buffer that comprises at least:

* Write Header (e.g., portion of meta-information)
* Write Data Blocks
* Write Footer (e.g., another portion of meta-information)

1018 — Write data to device

1020 — Update current write position

1022 — If ( Write Position at end of write block ) gosub GetWriteBlock

GetWriteBlock

1024 — Find 100% empty block

1026 — Find 2nd 100% empty block

1028 — if ( no 2nd block available ) gosub Defrag

1030 — Setup write pointer to head of empty block

Defrag

1032 — Find block with least number of active data blocks

1034 — Read Meta information from Disk

1036 — Scrub Meta information removing stale and duplicate entries

1038 — Loop through remaining data blocks

1040 —    Write data blocks with standard write routine

1042 — continue until end of data block list

1044 — Mark this block (with least number of active data blocks) as empty.

FIG. 10

FAST BLOCK DEVICE, SYSTEM AND METHODOLOGY

RELATED APPLICATIONS

This application is a continuation of U.S. patent application Ser. No. 15/396,904, filed Jan. 17, 2017, now U.S. Pat. No. 10,817,185, and claims priority from Provisional Patent Application Ser. No. 62/327,012, filed Apr. 25, 2016, and is a continuation-in-part of U.S. patent application Ser. No. 14/809,263, filed Jul. 26, 2015, now U.S. Pat. No. 9,535,830, which is a continuation of U.S. patent application Ser. No. 14/462,457, filed Aug. 8, 2014, now U.S. Pat. No. 9,092,325, which is continuation of U.S. patent application Ser. No. 13/769,455, filed Feb. 18, 2013, now U.S. Pat. No. 8,812,778, which is a continuation of U.S. patent application Ser. No. 12/041,509, filed Mar. 3, 2008, now U.S. Pat. No. 8,380,944, and claims priority from Provisional Patent Application Ser. No. 60/892,517, filed Mar. 1, 2007 and Provisional Patent Application Ser. No. 60/909,903 filed Apr. 3, 2007, the subject matters of which are incorporated herein by reference.

FIELD OF THE INVENTION

The application relates generally to optimizing access to block storage devices by replacing slow random writes with highly efficient linear writes, as well as methods for attaining the linear writes in different types of block storage devices, and block storage hardware devices derived from applying these methodologies to constructs of computer hardware, greatly reducing the wear on these data storage devices, thereby increasing the lifetimes of data storage devices employing the features of the present invention.

BACKGROUND OF THE INVENTION

Block devices are computer components, such as disk drives and other mass storage devices, such as flash-memory and RAM-based disks. Traditionally, for a block storage device, the application that is using the storage accesses the device using a "block number". The device driver then translates this block number into a physical address on the device. This translation process usually involves linearly mapping the block number into the corresponding location on the block storage device. This occurs because Block Devices derive from an older idea: magnetic tape, and ultimately reaching back to voice recording on a wax cylinder, such as early devices made by Thomas Edison. These analog devices were strictly linear, and block devices have historically preserved this idea of linearity, but have also flattened it out into individual tracks or groups of known blocks. Thus, the segmented linear technique ultimately has the effect of playing drop-the-needle, such as on an analog phonographic disk or record, but in a digital manner, providing the capability of something between near and actual random-access, depending upon the specific construction of the block device.

The use of this pseudo-linearity, whether in devices, such as hard disks with their tracks, or flash-memory disks with their concept of erase blocks to establish neutral charge, produces linear reads and writes of frames that are very fast, but in many devices produces random writes that are habitually slow, as well as slow random reads in some devices.

While linearity has been the ideal, it has never been absolute due to imperfections in media. For instance, today's disk drives have algorithms for mapping around bad blocks. Here, one has a separate redundant area set aside to accept contents of specific blocks known to be bad.

Similarly, the mapping process is not consistently linear at the application level. In some applications, a "mapping layer" is introduced. This mapping layer can exist for a number of reasons. For example, logical volume managers can map logical blocks into physical blocks to facilitate storage device management allowing dynamic re-allocation of space. Managers using Redundant Arrays of Inexpensive Disks ("RAID") technology can map data into redundant patterns allowing continuous operation even in the case of storage device failures. In all of these mapping layer implementations, the mapping is designed to be simple, and as much as possible linear. While RAID devices can intermix blocks across multiple storage devices, the overall mapping is still linear from low to high block number. This linear mapping is a basic paradigm of storage device management.

Another aspect of conventional device mapping solutions is that they are generally static in operation. While some mappings allow for dynamic updating, such as when a disk error is detected and a "bad block" is "grown", most mappings remain the same for the life of the device. Device re-mapping based on live updates is not a part of any existing block device implementation.

The genesis of the invention at hand results from an inherent problem and weakness in most Block devices: that random writes to these devices are very slow, and that random reads are sometimes very slow as well. For instance, a high-speed disk drive can read and write about 170 4-kilobyte blocks per second in a truly random fashion, but can linearly read or write at a speed approaching 10,000 4-kilobyte blocks per second. Similarly, a device built out of NAND flash memory can linearly read and write at well over 5,000 4-kilobyte blocks per second, and also randomly read at this high speed, but can randomly write 50 to 70 such blocks in a second.

While random-access slowness is not an issue for anything stored in a large format, such as a word processing document, or a picture of some sort, it is a problem if one is randomly accessing many small files or records. This commonly occurs in a database environment, and also occurs in environments, such as Internet Message Access Protocol (IMAP) email service where individual small files, such as individual email messages, are stored in a set of directories.

In the particular case in point, there is a desire to use a NAND flash memory device for the purposes of random access in a database environment. However, while such devices were superb in their read performance of random records, being a good thirty times faster than high speed disk drives, their random write performance was less than half the performance of high speed disks. Also, the limited write life of NAND flash memory, as will be discussed later, created concerns about product durability.

However, there may be other ways that data might be organized if it were convenient and useful. Journaling is a method of recording changes to directories and the sizes and position of files without recording the changed contents of a particular file. In Journaling, these characteristics changes are recorded in the sequential order in which they occur. Transaction logging is similar to journaling except that it is implemented at the application level, and records the actual data contents of the files or records in question as these are recorded. As with Journaling, in the event of system failure, Transaction Logs can be played forward from a known good time and data set, such as a completed file backup, in order to bring the data set right up to the instant before failure actually occurred.

As understood by those skilled in the art, Journaling and especially Transaction Logging are very space-intensive. Both were originally implemented in a non-block device specifically using magnetic tape or other low-cost linear media to record the transactions as they occurred. Over time, both have switched to the use of low-cost block devices, such as disk drives, as these are now cheaper than magnetic tape, and can be viewed, in their native linear order of blocks, as the logical equivalent of a very long tape.

Journaling, and especially Transaction Logging, are being mentioned here as one alternative system of viewing data in a manner that is both new and linear, in that the new copy of the data supersedes the old one if the media is played forward through time, and as an example of the advantages of writing data in an alternative order rather than an order fixed to a specific location. However, it needs to be remembered that both Journaling and Transaction Logging are only operable in a linear fashion from first to last because there exists no mechanism of independently remembering where the current version of every datum is located.

In addition, current block devices in basic storage and enterprise environments have a somewhat limited life, especially in systems, such as Flash memory, where repeated access of the device can wear down the device to the point of failure, even when the device is guaranteed for millions of such accesses. The culprit is a sequence of random writes that can quickly undermine the viability of any block device, such as dynamic memory.

What is needed are block devices that take advantage of storage techniques to minimize the wear factor and increase block device lifetime.

It is, therefore, an object of the present invention to provide such a paradigm of operation, whereby, through the use of the principles set forth herein, any block device can dramatically increase the inherent life expectancy through smart data structuring and avoidance of deleterious operations.

SUMMARY OF THE PRESENT INVENTION

The present invention relates to a method, device, and system for fast data storage on a block storage device, particularly regarding the reduction of wear through use of a better operational paradigm. The method includes, writing new data to an empty write block; tracking a location of the new data; and writing metadata associated with the new data. In one embodiment, the method further includes mounting the device, including reading each write block of the device and metadata associated with the each write block. The method may also include unmounting the device, including writing to each write block of the device and writing metadata associated with each write block. The method may include updating a lookup table based in part on the metadata; and reading the new data based on the lookup table configured to map a logical address to a physical address. Moreover, the method may also include optimizing the device, including writing to a write block having the fewest active blocks and writing metadata associated with each write block, wherein existing live blocks are packed to a front of the write block and rewritten to the device.

In one embodiment, a block storage device is directed to optimizing data access and update patterns. The device may include a mapping layer configured to dynamically remap data; and a plurality of data blocks, each data block storing map information, wherein each cluster of data blocks stores meta information, including an age of the data blocks of the cluster, a count of the data blocks of the cluster, and an array of logical block numbers for the data blocks of the cluster. In one embodiment, the device may further include a fast lookup table configured to enable looking up a logical block, a reverse lookup table configured to enable looking up a physical location, and/or a table configured to enable looking up a write block, wherein the table includes a number of valid blocks in each write block, and an age of data in the write block. Moreover, a system is directed to employing the method and the device. In one embodiment, the system may comprise a primary computer system in communication with the block storage device, wherein the primary computer system is configured to provide the empty write block.

In an alternate embodiment, the method includes writing at least one portion of meta-information associated with a plurality of write blocks; getting an empty write block for writing the new data, if a current write position is at an end of the plurality of write blocks; writing new data in one of the empty write block or one of the plurality of write blocks; and updating a lookup table based on an address where the new data is written to. The method may also include defragging the block storage device if a first empty block and a second empty block is unavailable for writing the new data.

In one embodiment, the device may include a segment of known data in logical and linear order; a further segment of free space for the acceptance of updates; and a logical area for storing update reference changes. The device may further include a CPU configured to perform actions. The actions may comprise determining if space is unavailable for a current write block. If so, the actions may further comprise getting an empty write block; writing meta information and new data associated with a logical address to the empty write block; and updating a lookup table based on an address of the empty write block. The actions may further include reading the new data based on the lookup table. In one embodiment, the actions may further include defragging the device if the empty write block is unavailable.

Moreover, a system is directed to employing the method and the device. In one embodiment, the block storage device may be a storage appliance, a NAND-flash drive, or a hybrid RAM/Disk drive storage device. In one embodiment, the lookup table may be a reverse lookup table configured to enable looking up a physical location.

The invention set forth in the various methods, devices and systems further encompasses a paradigm of operation that minimizes operational wear of components practicing the invention. Through a technique including linear writing and write segment structuring, the present invention is able to decrease component wear, and concomitantly increase component life expectancy, offering a methodology that is critical in the ever-increasing pace of technological innovation, making consumer and other products employing the invention better.

BRIEF DESCRIPTION OF DRAWINGS

The features, aspects, and advantages of the present invention will become better understood with regard to the following description, appended claims, and accompanying Drawings where:

FIG. 8A-8B show embodiments of logical flow diagrams for mounting a block storage device;

FIG. 10 shows another embodiment of a logical flow diagram for writing to a block storage device;

DETAILED DESCRIPTION OF THE PRESENT INVENTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the spirit and scope of the invention. The present invention is not intended to be limited to the embodiments shown, but is to be accorded the widest possible scope consistent with the principles and features disclosed herein.

The Fast Block Device and associated methodology according to the present invention is a device mapping layer that has a completely different purpose than that of standard block devices. Instead of being a simple linear translation of a logical block number to a physical device address, the Fast Block Device and associated methodology dynamically re-map the data to optimize data access and update patterns. This dynamic re-mapping can be used with a variety of storage devices to achieve massive performance improvements over a linear mapped device, as well as other benefits for certain specialized types of hardware. For instance, when the Fast Block Device concept is applied to flash memory, the speed of random writes made to that device can be increased by almost two orders of magnitude.

While existing devices overwrite existing blocks of data, and thus are forced into random writing patterns, the Fast Block Device of the present invention writes to open free space in a linear manner. It writes data in the order it is received because this is an efficient manner of assuring data integrity by assuring that older data is written before newer data. Any linear order could be imposed. The innovative Fast Block Device presented herein remembers the exact location of each newly-written component, in the process "un-re-membering" the older copy, and also has elements that allow for the purging and removal of expired data superseded by newer copies, as needed, or during quiescent periods so that, unlike a journal or log, one cannot run out of space, but will rather stay within the allotted Block Device.

Because the Fast Block Device can re-map data on the fly, the actual mapping information is stored with the data blocks themselves. Each cluster of data is stored with "meta information," "metadata," or "control data" that describes which blocks are actually stored where. This meta information occupies sectors on the storage device and is optimized to use a minimal amount of space.

Figure 1:
FIG. 1 shows an embodiment of a control block.

In one embodiment, as shown in FIG. 1, the meta information includes a signature 102, an "age" 104 so that "newer" data is recognized as valid over "older" data when a Fast Block Device is mounted, a count 106 of the number of data blocks that follow, and an array 108 of the logical block number(s) for the data blocks following.

Figure 2:
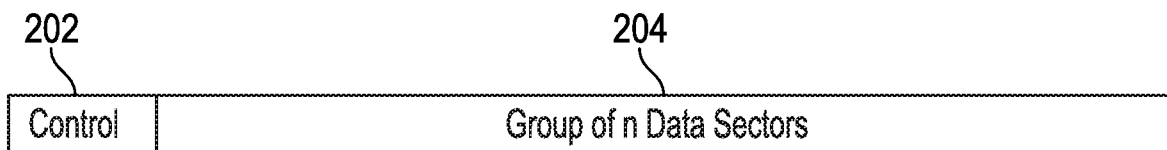
FIG. 2 shows an embodiment of a write segment with a control block.
Figure 3:
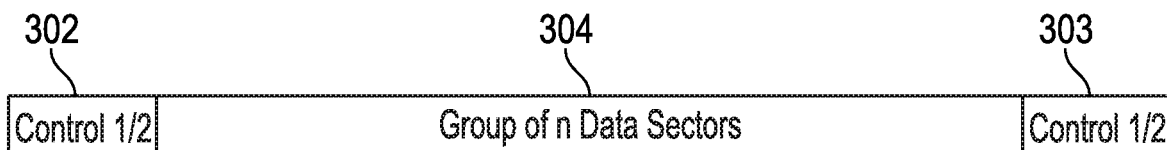
FIG. 3 shows an embodiment of a write segment with a split control block.

As shown in FIG. 2, as a minimal implementation, the metadata 202 is followed directly by the data blocks themselves. As shown in FIG. 3, a better solution is to split the metadata into the sector(s) 302-303 that both precede and follow the data storage blocks 304. The metadata may be split in any proportion (e.g., 50/50, 60/40, etc.). This way, failures during device writes can be detected and the ambiguous data discarded.

Each of these meta-data and data-block sections are then stored in larger storage units called write blocks or simply "blocks". In one embodiment, these larger units are designed to match or be a multiple of any natural write unit that the storage device hardware may impose. For example, NAND-based flash drives have an "erase block" size and the Fast Block Device should be setup to maintain these write blocks as a multiple of the flash erase block size. Similarly, for many hard drives, it would be set up to correspond to the track size.

Depending on the sector size, block size, and write block size, a write block might be represented by a single write cluster or might be represented by several. This depends on whether the metadata will fit into a physical sector representing the entire write block, or just a portion of it, and the degree of control obtained over the device. For instance, if one can gain direct access to NAND memory, rather than going through the control routine of a vendor trying to make NAND appear to have the function of a hard disk drive, one can nominally write single blocks in a linear fashion, writing each sector in real time, rather than as a linear group, and thus assuring a machine with greater data integrity at a given point of failure.

Figure 4:
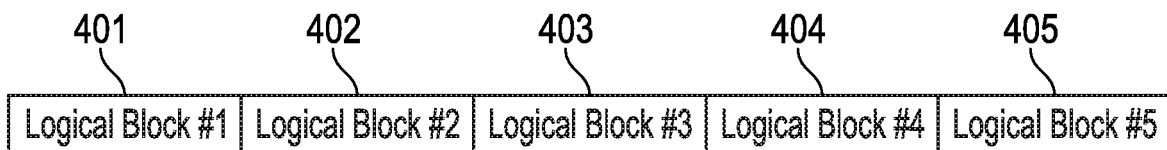
FIG. 4 shows an embodiment of a lookup table.
Figure 5:
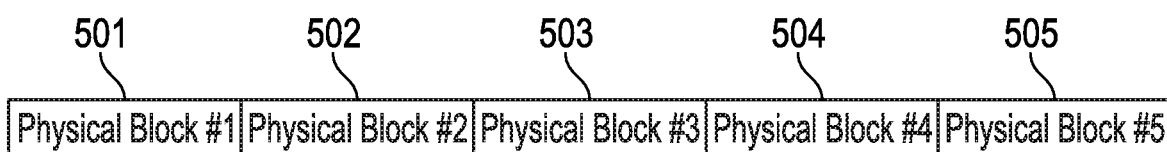
FIG. 5 shows an embodiment of a reverse lookup table.

In one embodiment, a Fast Block Device implementing the invention may maintain three sets of tables (e.g. FIGS. 4-6), block driver internal tables, in RAM that allow for fast lookup of stored information. As shown in FIG. 4, the first table allows an application to look up the actual current location of any logical block. As shown in FIG. 5, an optional reverse lookup table lets the Fast Block Device lookup what is at any particular physical location and determine if it is still in use or expired. These bidirectional lookups are constantly updated as the mapping dynamically changes.

Figure 6:
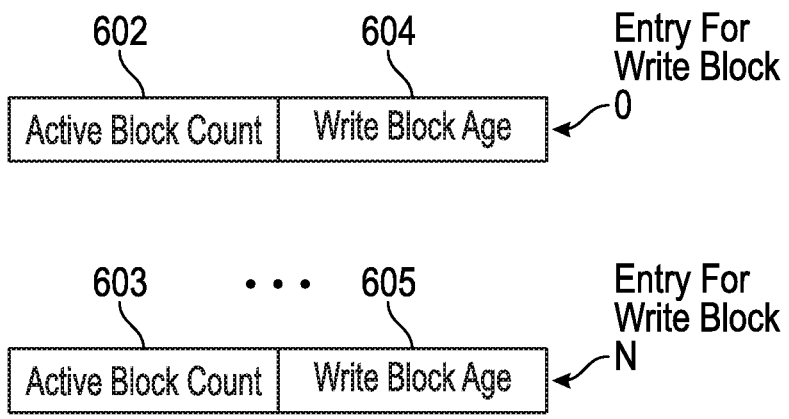
FIG. 6 shows an embodiment of a write block lookup table.

The Fast Block Device also maintains a third table, a write block table as shown in FIG. 6. This table enumerates the contents of each write block on the device. The table includes the count 602-603 of active blocks in each write block, plus the "age" 604-605 of the data in the write block. This table allows the device to determine which write block or blocks may be written to most effectively, in that those most-empty of real data can be most efficiently written to using a linear write.

It should be understood to those of skill in the art that the Fast Block Device and methodology of the present invention has performance and reliability advantages in a number of applications and hardware scenarios because it converts random writes into linear writes which are often several orders of magnitude faster than random writes.

When used with NAND-based flash drives, the Fast Block Device can dramatically improve overall application performance for applications that use large numbers of random reads and writes by improving random write performance, for example:

| | |
|---|---|
| Random Reads | No performance change |
| Linear Reads | No performance change if the blocks were written linearly. Minor performance degradation if the blocks were written randomly. |
| Random Writes | Very large performance improvement. In many instances, write performance will increase 100-fold. |
| Linear Writes | Small performance degradation because of metadata management. |

One side-effect when used with NAND-flash drives is that the number of erase block operations to the drive is minimized reducing wear. This is important because NAND-flash can accept a limited number of erase-block operations before it fails. For low-end NAND memory, failure may occur after 10,000 write cycles. In high quality memory the failure point for erase block operations raises to the level of a million or so. For many applications that do large numbers of small writes, the Fast Block Device can reduce the number of NAND-flash erase operations, often by a factor of 50 or larger.

For an 8G flash device rated at 1,000,000 write operations, as little as 4 gigabytes of 4K writes to the same logical block can cause the device to fail. Thus, things such as swap-space operations can, if applied to flash-memory, wipe out the capacitance of that memory in just a few hours. When addressed as a Fast Block Device, this same device can at worst handle over 200 gigabytes of write operations to a single sector because that sector will no longer be tied to one physical spot, and because writing leading to a required erase-block operation will occur less frequently.

In a more typical enterprise application, and assuming that the device does "load leveling" across all erase blocks, one can expect to write about 3 petabytes before an 8 gigabyte device wears out. With most applications, this would take many years of continuous, and saturated, writes.

Even worst case applications like swap partitions that are notorious for killing flash devices are practical when mapped through the Fast Block Device. Plus, swap runs fifty times faster when swapping to flash directly.

When used with flash media, the inherent space consolidations methods of Fast Block Device can return no-longer-used frames to a null, all-zeros condition, thus reducing the chance of unlinked data becoming inadvertently exposed because it is not scrubbed, a security advantage.

When the Fast Block Device is used with traditional rotating media, i.e., hard disk drivers and hard disk arrays, a performance shift is experienced that can be very advantageous to applications, such as database environments, that employ large numbers of random reads and writes. In general, with rotating disks, the Fast Block Device can be expected to:

| | |
|---|---|
| Random Reads | No performance change |
| Linear Reads | No performance change if the blocks were written line linearly. Significant performance degradation if the blocks were written randomly. |
| Random Writes | Large performance improvement, typically of 40 to 50 fold. |
| Linear Writes | Small performance degradation because of metadata management. |

The Fast Block Device and methodology of the present invention can also be used with a RAM-based storage table, plus a disk-based backing device, forming a hard disk hybrid solution. The RAM storage is used for reads and the disk drive is used to real-time store updates at linear speeds which are fifty-fold faster than random write speeds. This gives the performance of a RAM disk with the non-volatility of a standard hard disk drive, for example:

| | |
|---|---|
| Random Reads | Run at RAM speed |
| Linear Reads | Run at RAM speed |
| Random Writes | Run at disk linear write speed |
| Linear Writes | Run at disk linear write speed |

As is shown, this solution produces the fastest Fast Block Device possible, but at the cost of RAM. The advantages of a Fast Block Device in conjunction with RAM is greater media concurrency and selectively higher transfer speeds. Standard RAM technologies presume that the disk drive is not updated until the system is shut down. This creates a risk in the event of battery failure, and may, in some designs, also result in a situation where the RAM drive cannot be used until all of the disk has been read into memory. Conversely the Fast Block approach assures that the system is fully physically saved to within 2 seconds of even an irregular catastrophic shutdown, while making the drive available within a few seconds of a system boot. In addition, because Fast Block can be implemented within the system itself rather than as a separate device, read times can actually be faster for core memory resident "disk."

Figure 11:
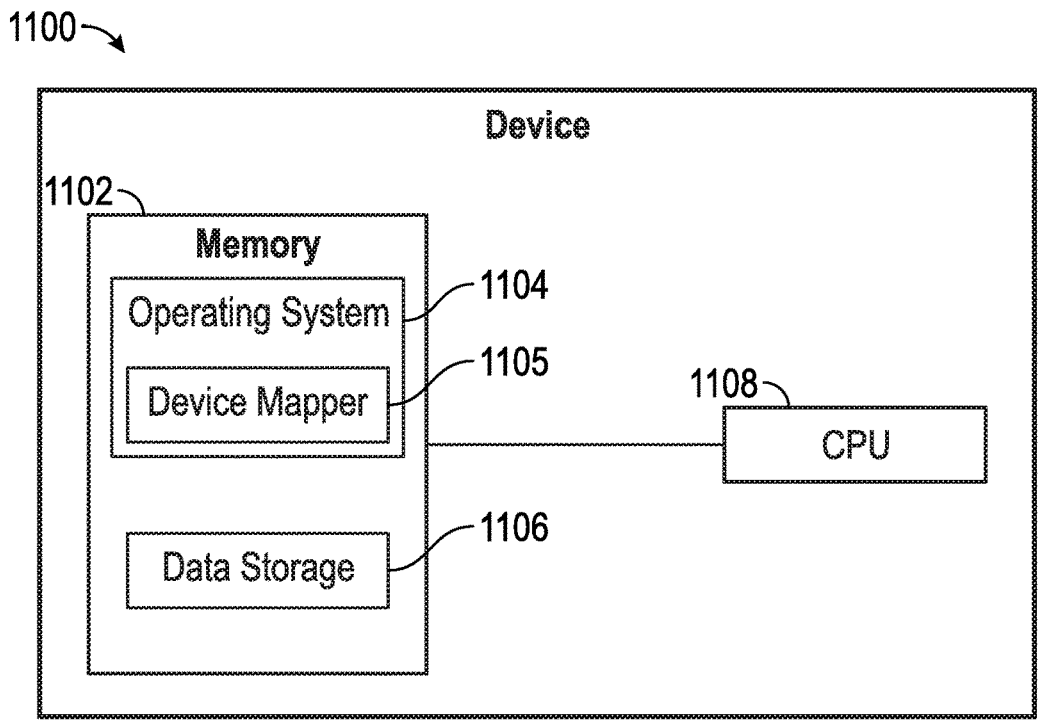
FIG. 11 shows one embodiment of a fast block device.

FIG. 11 shows one embodiment of a Fast Block Device. As shown, device 1100 comprises memory 1102, operating system 1104, data storage 1106, and CPU 1108. However, other embodiments may comprise more or fewer components without departing from the scope of the invention. For example, in some embodiments, device 1100 may not include a CPU 1108 and/or an operating system 1104. Operations of device 1100 may be performed by dedicated hardware, such as an Application Specific Integrated Circuit (ASIC) (not shown), or the like. In some embodiments, device 1100 may be a NAND-flash drive, an 8G flash device, a RAM-based storage table, a disk-based backing device, a storage appliance, or the like. In one embodiment, data storage 1106 may be RAM, a disk drive, RAM/Disk drive hybrid, an external storage device, a flash drive, EEPROM, or any other data access component. In one embodiment, data storage 1106 may store at least some write blocks for use with the present invention. The write blocks may be configured as shown in FIGS. 1-3. Memory 1102 may store the regular table of FIG. 4, the optional reverse lookup table of FIG. 5, and/or the Write Block table of FIG. 6. Device 1100 may perform the operations described in FIGS. 7-10.

As discussed hereinabove, the Fast Block Device 1100 and methodology of the present invention can be implemented at many different layers. For example, it is possible to implement the Fast Block Device in the application itself, as a "device mapper" 1105 in the host operating system 1104, as a part of the device itself, and/or as a part of a storage "appliance" that is external to the primary computer system (not shown).

In referencing a "storage appliance," presumption should not be limited to the classic idea of a drive "appliance," which would typically comprise a server box holding a large number of drive devices of the same class. Rather, one should think in terms of both micro-devices and of composite devices. For instance, if one were to combine two flash drives together with a traditional 2.5 inch hard disk drive as a parity drive, one could build a composite device that would function as a RAID-4 assembly that had the same overall performance characteristics as a RAID-4 assembly made purely out of flash memory materials. Similarly, one could build the entire highly reliable assembly in a traditional 3.5" form factor.

Similarly, the technology of the instant invention can be applied at an application level and can cover a portion of the disk (e.g., data storage 1106). As an example at an application level, this technology might be applied to the problem of swap space stored on disk. Currently, updating this space can be slow because of the problem of random writes. Responsiveness of this application can be improved by an estimated factor of twenty if this technology is used to replace massive numbers of random writes with linear writes.

The benefits of the Fast Block Device and methodology of the present invention are many. For example, when used with NAND-flash storage devices, write performance is greatly improved with little or no read penalty, and drive durability is greatly improved also. Further, use with standard hard disks allows applications that generate small random writes to run at drive linear write speeds with no special hardware required. Finally, when used as a RAM/Hard Disk hybrid, RAM performance for all reads increases, linear disk performance for all writes increases, and a persistent RAMDisk is created without requiring any special hardware.

The following is a general description of device implementation and operations pursuant to the teachings of the present invention. Of course, as understood by one skilled in the art, the actual implementation of the device may vary depending upon the hardware the device is mated with and the intimacy that can be achieved with the underlying hardware.

By way of definitions, the following describes some currently performed definitions of various terms used in conjunction with the description of the present invention.

Sector: One storage unit on the device, e.g., a physical sector (512 bytes) or some multiple depending on the formatting parameters that were chosen. Many current systems favor either two kilobyte or four kilobyte sectors.

Control Area or Control Block: As shown in FIG. 1, typically one storage unit (Sector) of data comprises a signature 102, and aging counter 104, a count of data area blocks 106, and a list 108 of logical sectors that are stored on the device "here".

The control area might be a single storage unit (Sector) in front of the logical data (See FIG. 2), or it may be split into two halves (or other proportions), one in front of the data and one behind (See FIG. 3). If it is split, then there are two signatures and two aging fields. The advantage of splitting is that this is a mechanism of assuring that the write of the control area and associated data area is complete. If not complete, corruption of the second half will be apparent. Writing of a split control block does not require extra storage space. Rather, each data area element can begin at a known byte offset from the associated basepoint.

A Control Area can also extend over multiple Sectors if enough data is written in a single operation and this additional space is needed to store the array of logical Sector numbers.

Data Area: This is the area where actual data is stored (e.g., 204 and 304). It is the same overall size as the sum of all the data sectors being written. The data area immediately follows its control area. In the event of a split control block, it is immediately followed by the second half of the control area.

Write Blocks: A write block is data of a size of an area that is written at one time. In NAND-based flash devices, it should be the size of, or a multiple of, the inherent erase block size of the device. NAND-based flash devices that are a part of an array would require Write Blocks sizes that would cause the array to write each devices erase block on a boundary. Thus, in a four drive RAID-5 array, the write block is properly three times the erase block size.

With other devices, the Write Block should be large enough to achieve linear write performance and thus will approximate a track length, or a multiple of tracks if a RAID device is used.

Write Segment: A write segment comprises of a Control Area followed by a variable-length Data Area (See FIGS. 2 and 3). Under normal circumstances with heavy write usage, a write segment will equal the length of a write block. However, in order to assure that physical writing of data is timely, the system will typically have a timer that assures that whatever has accumulated in the last several seconds will be written even if enough contents have not accumulated to fill a Write Block.

In such a circumstance, several Write Segments may be written to the same write block successively. As long as all segments are written to the same Write Block sequentially they will all have the same age. Similarly, as is consistent with the concept of transaction logging, in a highly volatile logical block, several copies of the same block may occur in succeeding segments. However, the tables, as discussed later, will keep track of which physical block represents the most current copy of a particular data block.

Active Write Block: An area of memory, the size of a Write Block, where writes are buffered.

Unlike data in a Transaction Log, data stored in the Fast Block Device can be found, comparatively rapidly in an absolute sense merely by examining all of the control blocks on the device. However, such a scanning method, even while immeasurably faster than beginning to ending read of media, is not suitable for real time retrieval of data. To achieve real time translation, what is required is a series of tables to translate logical references into real physical locations as well as to determine whether real physical locations contain currently active data, null contents, or older, and now inactive data that can be purged.

As shown in FIG. 4, the regular lookup table identifies exactly where a logical block currently physically resides on the physical block device. For example, cell 401 stores the physical location of logical block #1, cell 402 stores physical location of logical block #2, and so forth. Typically, this table will reside in the main memory 1102 of the CPU 1108 which is managing the individual device, or a group of such devices. Memory may have a sufficient number of bits to remember every possible physical location on the physical device, or devices, being managed. In one embodiment, if a sector address in the table is not populated and referencing an explicit physical frame, it returns all zeros.

As shown in FIG. 5, the reverse lookup table identifies the logical block to which every physical block (i.e., sector) of the physical device, or devices, references to. For example, cell 501 stores the logical block of the physical block #1, cell 502 stores the logical block of physical block #2, and so forth. If a specific physical frame does not equate to a currently active logical frame, the system will be informed by having all zeros returned to its query.

As shown in FIG. 6, the Write Block Lookup Table has one entry per write block. For example, FIG. 6 shows entries for write blocks 0 to N. This is a comparatively small table. For instance, a 32 GB flash drive with 500 kilobyte erase blocks would have 64,000 of these, compared with millions of sectors. The write block lookup retains a total count of active blocks, as well as the age of the write block.

Each entry has an active number of blocks field (602-603) which is the sum of all sectors of data in the write block, less any of those sectors that have been made redundant by a later update of the same logical sector (which would be written somewhere else, given that Fast Block Device may not overwrite).

Each entry has an age which is an incremental value, beginning at zero, and incremented every time a new block is accessed for purposes of writing new contents.

Figure 7:
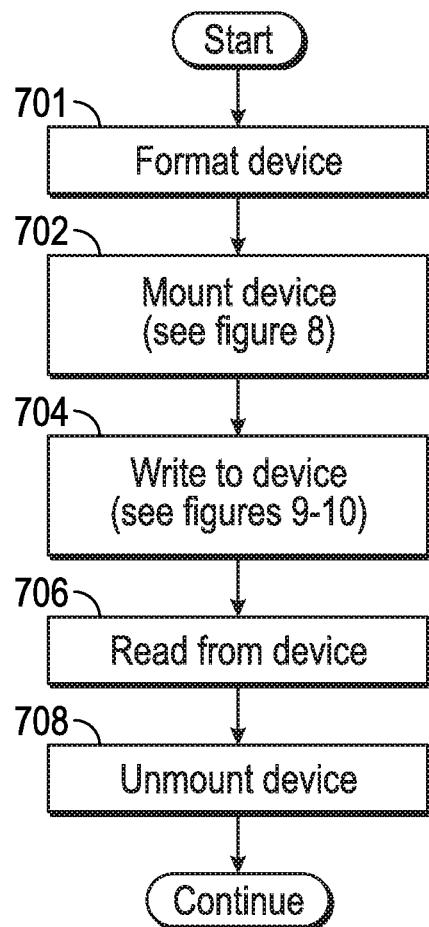
FIG. 7 shows one embodiment of a logical flow diagram for fast data storage on a block storage device.

In the following section of the specification of the present invention, the general functions of the Fast Block Device will be described, with particular notice taken of special conditions that may occur in selected hardware scenarios. One embodiment of a process for performing the operations of the present invention is shown in FIG. 7.

It should be understood that in order to use a device, it must be initially formatted. Briefly, this involves writing an empty control sector at the front of each "write block". After the device is formatted, all logical blocks are unallocated, so the device basically reads zeros initially.

Figure 8A:
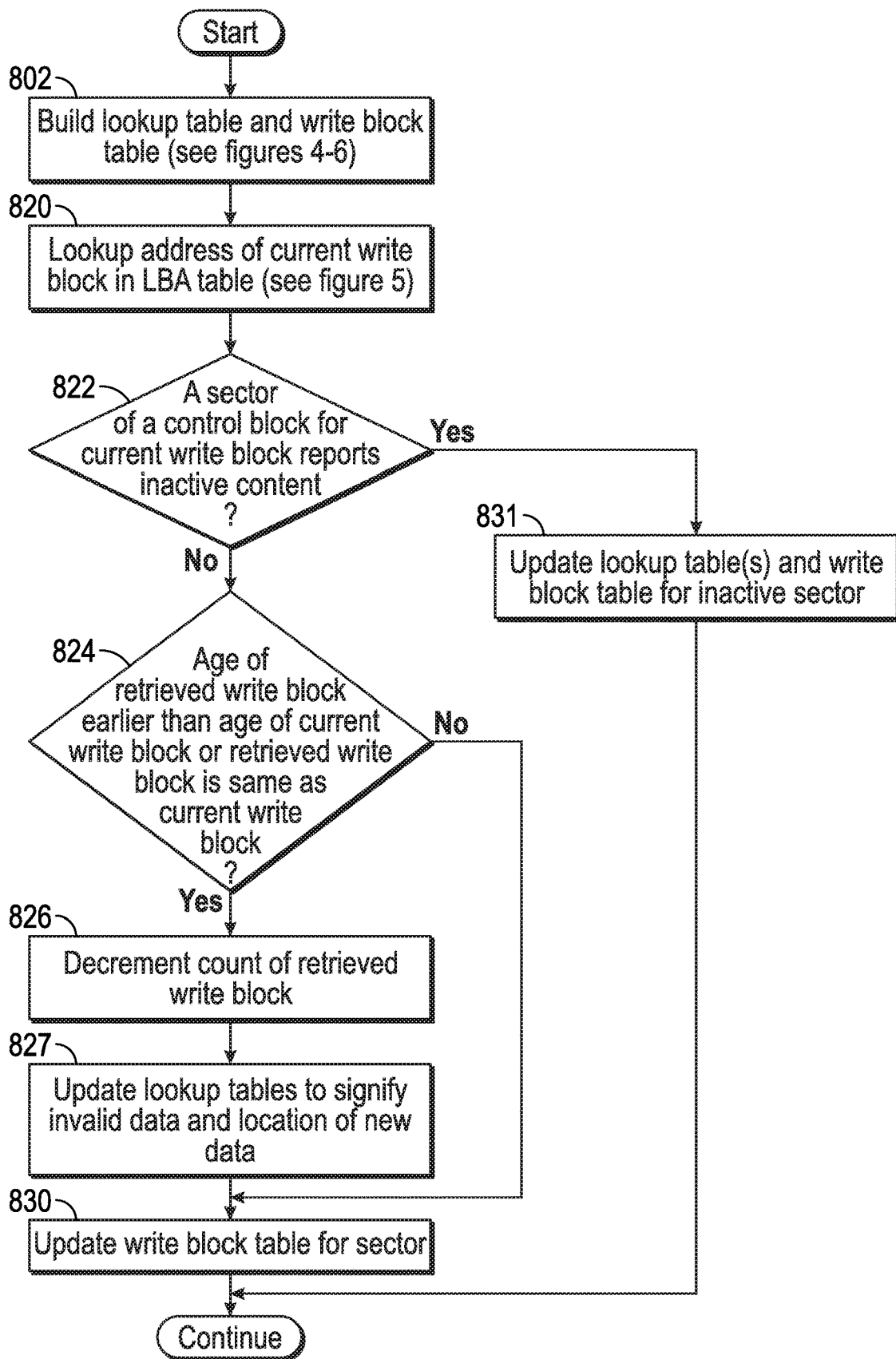

Because the sector mapping of a Fast Block Device is dynamic, the device must be "mounted" before it is used. FIG. 8A shows an embodiment for mounting the device.

At block 802, the mount process starts out by building the three internal lookup tables and zeroing them out. It then reads the Control Area for each Write Block. When this area is read, it first reads the control area of the first Write Segment of the Write Block. It then builds the write block table entry (FIG. 6), referencing the age portion of the table. It then parses the list of sectors in the Control Area. Each referenced Sector is translated through the regular lookup table (FIG. 4). At block 820, an address for the current write block is looked up in the lookup table(s) (see FIG. 5).

At decision block 822, it is determined if the sector reports inactive contents (a zero condition in the lookup table). If so, processing continues to block 831 where the lookup table (FIG. 4) is updated with the new contents. The reverse lookup references the physical frame. Finally, the write block table (FIG. 6) is incremented to indicate an additional consumed frame.

Conversely, if at decision block 822, it is determined that the sector reports active contents (a non-zero condition) in the lookup file (FIG. 4), the physical reference is then translated into a write block reference (as each write block has a known number of Sectors). The write block is then looked up in the relevant table (FIG. 6).

At decision block 824, it is determined if the age of that write block is earlier than the current write block, or if the write block referenced is the same write block as the current write block. If not, processing continues to block 830. Otherwise, at block 826, the write block which now has an unusable sector has its active count of sectors decremented (FIG. 6). Subsequently, at block 827, the new physical referent is referenced in the lookup table (FIG. 4). Similarly, the Backward lookup table (FIG. 5) is now updated both by setting the old sector reference to all zeros, and by referencing the logical frame in the proper point. Finally, at block 830, the new table referent in the Write Block Lookup (FIG. 6) has its counter incremented.

Processing loops back to block 820, until all the elements in the list part of sectors of the control area have been thus computed. The system then checks recursively to see if there is a next Write Segment in the Write Block, and if found, repeats the posting process.

On flash drives, the current time to mount a drive may be several gigabytes per second. Thus, in some embodiments of the invention, a 32 GB drive can be mounted in about fifteen seconds.

FIG. 8B shows an alternate embodiment of and elaborates on the steps of FIG. 8A described above. Like step/block numbers represent similar processing. As shown, FIG. 8B shows a routine for reading a device header record. Processing begins at step 802, where tables (FIGS. 4-6) are initialized to empty.

At step 804, processing begins to loop through each write block. For each Write Block, at step 806, processing begins to loop within a Write Block until the end of the Write Block is reached.

For each iteration of loop 806, processing begins at step 808. At step 808, Meta Information/Header is read at the beginning of an address array.

At step 810, it is determined if the header is invalid. If so, processing skips to the next Write Block (go to step 836).

At step 812, a size and location of the rest of Address Array and Meta Footer (2nd half or portion of meta information) is calculated.

At step 814, the rest of Address Array and the Meta Information Footer (if one exits) is read.

At step 816, if the Meta Information Footer does not match the Meta Information Header, processing skips to the next Write Block (go to 836).

At step 818, processing loops through each address in the Meta Array (addresses associated with the Meta information). For each iteration of loop 818, processing begins at step 820 where an Address in a LBA table (lookup table(s); See FIG. 5) is looked up.

At step 822, it is determined if the address exists. If so, processing continues to step 824. Otherwise processing continues to step 828.

At step 824, it is determined if an existing address is newer. If so, processing skips to the next Address (go to 832). Otherwise, at step 826, the existing address is removed.

At step 827, a fill counter(s) associated with the Meta Information for the existing write block is decremented.

At step 830 the LBA (lookup table(s) of FIGS. 4-5) is updated with the new address and the fill counter(s) for this block (associated with address in Meta Array) is incremented.

At step 832, loop 820 is repeated for all address in the address array.

At step 834, loop 818 is repeated until the end of the write block is reached.

At step 836, loop 804 is repeated for all write blocks.

Processing then returns to other computing.

Referring back to FIG. 7, at block 704, data is written to the device. The write process may be complex because it comprises reconstruction of and appendation to a current write block. In order to make this process extremely clear, it will be described in its logical steps below in conjunction with FIGS. 9-10.

At block 706, the device is read. Read operations are very simple. Data is either present and in a known location because of the initial mount and subsequent properly documented writes, or a particular sector has not been written to. When the read request comes in from the application, a lookup is made for the logical sector in the lookup tables (FIG. 4). If the sector is present, a read is issued to the device using the lookup location. If the sector is not present, a data block of zeros is returned.

Read operations can lookup sectors that are in the Active Write Block. In this case, the data in the Active Write Block is used instead of actually reading from the device. The reasons for doing so are both efficiency and data integrity. Until update is confirmed, it is uncertain whether the data is actually present.

At block 708, the device is unmounted. In one embodiment, unmounting may comprise writing to each write block and writing metadata associated with each write block. Because the data and meta information is written simultaneously, and can be written in update sequence order, an unmount operation may not be required. Because the Fast Block Device does delay writes for a short time (typically less than 2 seconds), a "flush" command to force writes out prior to a power down might be appropriate for some applications and platforms.

The write process is complex because it requires reconstruction of and appendation to a current write block. In order to make this process extremely clear, it will be described in its logical steps. Once the general steps have been described, the refinements will be described.

Figure 9:
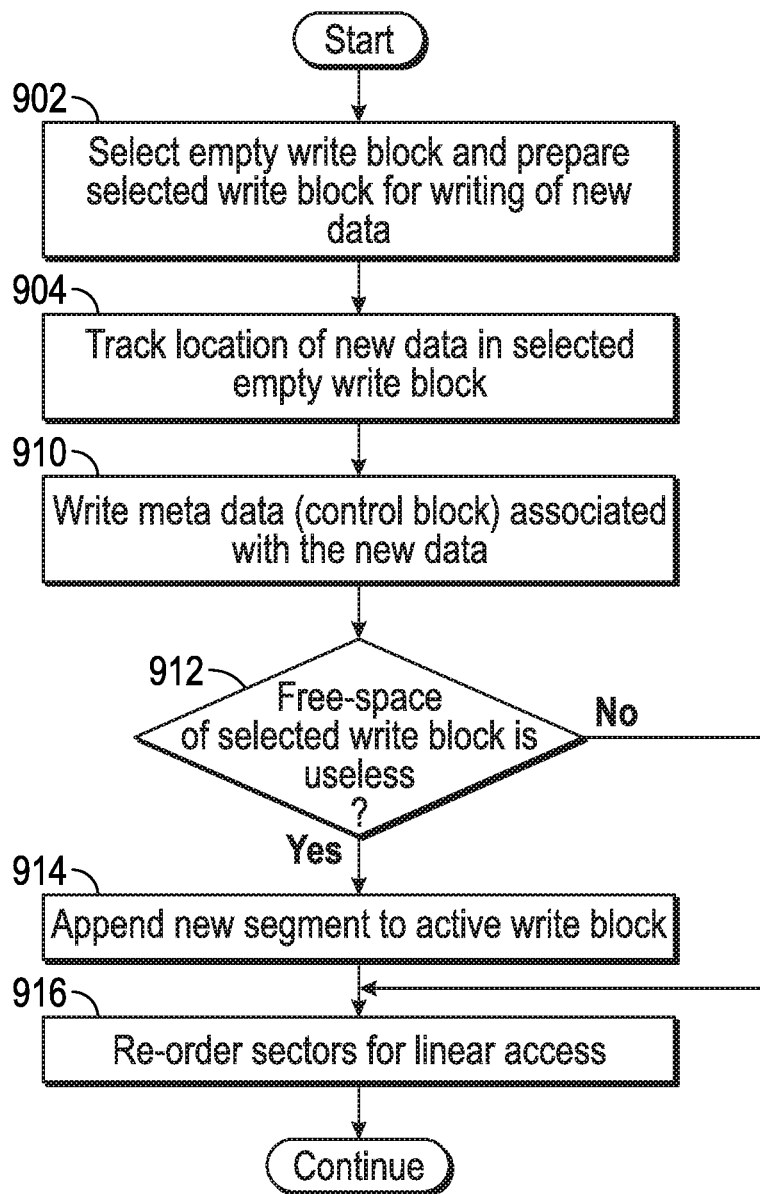
FIG. 9 shows one embodiment of a logical flow diagram for writing to a block storage device.

FIG. 9 begins at block 902, where an empty block is selected and prepared for writing of new data. In one embodiment, it may be determined which block in the system is most empty. This is done by consulting the Write Block Table (FIG. 6). By comparing all of the cells in this table, it is possible to determine which Write Block has the most free space. An enhancement of this to create a series of indices of the different fill levels can optimize this process.

Once selection has been made, at block 904, the location of the new data in the selected empty block is tracked. A segment of memory is cleared to accept both its old contents and any new contents. This segment has been referred to above as the Active Write Block, and comprises both a series of data blocks that may be written, as well as an actively constructed Control Area sector, as described in FIG. 1.

Once a particular Write Block has been selected and cleared, its active sectors—those containing still-current data—are read into memory in consolidated order. The determination and reading is done via an extension of the comparison process described in the Mount operation. However, those sectors containing Control Area information or actual still-current data still have to be read. The read process is inherently linear and extremely fast. However, the non-reading of some sectors reduces data congestion in the pipe.

Such Data as is read will be moved, sector by sector into the Active Write Block. Similarly, the meta-data or control block is built by appending the logical frame numbers to the list and incrementing the quantity of active Sectors referenced. As New Sectors are received for writing, these are appended to the Active Write Block by writing the new data to the Active Write Block while updating the Control Area Sector (meta-data).

At block 910, the meta-data (control block) associated with the new data is written. In one embodiment, once the Write Block is full, the write block (comprising the meta-data/control block) is immediately written as a linear write. The Write Segment, in this case, is equal to the size of the Write Block. In one embodiment, the process may then proceed to selection of a new Write Block.

For writes as a result of turnout, an adjustable timer allows premature write of a portion of a write block even if the write block is not full. Typically, this will be set to occur if there has been actual data to be written within the last two seconds, but not enough new data has been encountered to justify generation of a full Write Block. In this case, what is written is a Write Segment shorter in length than the actual Write Block.

At decision block 912, it is determined if, at the end of this segment writing, still-free space is useless (such that, for instance, only one sector is free). If so, the process will proceed to selection of a new Write Block at block 902. Otherwise, at block 914, a new segment will be appended to the Active Write Block. This segment, comprising a Control Area Sector and a series of newly-to-be-written data blocks will continue until it, in turn, reaches a condition where either the Active Write Block is full or where another inactivity timeout occurs.

Actual Writing of the block, or writing of the first Write Segment to a Write Block, is done to an empty block. Thus, if the system crashes for any reason, the newest data may be lost. All earlier data is preserved. When a Write Block is closed out and before a new Write Block is determined, the extant write block which was the source of merger is, if not already empty, purged and written with a zeroed control block.

It has been noted that quiescent consolidation process will dramatically increase average writing speed but, in some embodiments, the disadvantage is that older, expired, data blocks will remain extant and that similarly there will be excess Control Area Sectors as a result of timeouts and the segmentation process.

Similarly, an efficient mechanism of writing data is to write it to a totally empty Write Block. A situation where, for instance, all blocks are seventy percent full will be less write efficient than a situation where seventy percent of the blocks are totally full and thirty percent are totally empty.

The accumulation of garbage, and the advantages of imbalance suggest the need for an ongoing process to build these optimums by an ongoing process of taking several partially-full Write Blocks and consolidating these into full blocks or empty blocks. All this can be obtained as part of the write process described above. Similarly, the same can be done without hindrance to newly to-be-written data as the quiescent process can be interrupted to accept new write Sectors as part of an Active Write Block in favor of consolidation of an existing set of blocks.

As described hereinabove, where leveling involves watching for "active" areas and "static" areas and moving the data around on the storage device to spread flash erase operations around.

At block 916, sectors may be re-ordered for linear access. Restoring linear sectoring ordering may not be necessary when dealing with randomly accessible storage devices like RAM and Flash RAM. In the case of using the Fast Block Device with a rotating disk drive, this involves scanning each Write Block and deciding if the order is fragmented "enough" to justify re-ordering. If re-ordering is deemed desirable, then linear Sectors are read from the device and then re-written. Reordering sectors for linear access patterns may be combined with coalescing Write Blocks in that re-ordering into partially filled Write Blocks will be ineffective.

In an alternate embodiment, when Fast Block Device can be used intimately at the chip or component level, the nature of implementation can change profoundly to improve performance, efficiency, and reliability. For instance, if the technology is implemented with NAND Flash Memory chips directly, such that the Flash can be treated as memory rather than disk, one can get rid of the reverse lookup table entirely. Similarly, one can change the structure of the Control Area, appending to the list of logical IDs in real time while also updating the data areas in real time. Thus, the entire system can receive random writes and linear writes and dispose of both at near the linear write speed of the device. Similarly, the nature of this design, and the use of intelligent processors, allows building of a composite assembly that has greater reliability and speed, and lower cost. For instance, when flash is managed in this manner at the system level, it is possible to think of four "drives" instead of one, each of which is a removable card. Thus, one can think of a RAID-5 assembly in a very small format reading and writing at collective speeds far faster than the inherent NAND Flash itself, together with faster I/O pipes such as the fastest SCSI interface to the parent device. Conversely, one can do this while leveraging other cost advantages such as somewhat lower quality or larger erase blocks. For instance, the inherent nature of Fast Block Device allows use of 1, 2, or 4 megabyte erase blocks in the same manner as the current 500 kilobyte blocks.

FIG. 10 shows another embodiment of a logical flow diagram for writing to a block storage device. FIG. 10 describes an alternate embodiment and an elaboration of FIG. 9 described above.

FIG. 10 begins at subroutine Write at step 1002. At step 1002, it is determined if no space exists in the current Write block. If so, processing continues to the subroutine Write-Push at step 1010. WritePush returns after appropriate processing.

Processing then continues to step 1004, where at least a portion of the block is tested to determine if it is cleared. For example, the block is tested if it comprises the hexadecimal number 0000/FFFF.

At step 1006 the block address is added to the write array.

At step 1008, it is determined if the block is not cleared (e.g., if at least a portion of the block does not comprise 0000/FFFF). If so, the block data is copied to the write buffer. Processing then continues to other computing.

Subroutine Write Push begins at step 1010, where a write buffer is built that comprises at least a Write Header (a portion of meta information), Write Data Blocks, and/or a Write Footer (another portion of meta information).

At step 1018, data is written to the device (Fast Block Device).

At step 1020, a current write position is updated.

At step 1022, it is determined if the Write Position is at an end of the write block. If so, then processing continues to subroutine GetWriteBlock. GetWriteBlock returns after appropriate processing, and processing continues with other computing.

Subroutine GetWriteBlock begins at 1024, where a 100% or substantially empty block is found.

At step 1026, a second 100% or substantially empty block is found.

At 1028, it is determined if the second block is unavailable. If so, then processing continues to subroutine Defrag. Defrag returns after appropriate processing.

At step 1030 a write pointer is setup to a head of an empty block. Processing then continues to other computing.

Subroutine Defrag begins at step 1032 where a block with a least number of active data blocks is found.

At step 1034, meta information is read from disk or other data storage 1106.

At step 1036, meta information is scrubbed and stale and duplicate entries are removed.

At step 1038, processing loops through the remaining data blocks. For each remaining data block, step 1040 is performed. At step 1040, data blocks is written with a standard write routine. At step 1042, it is determined if the loop should continue. The loop is continued until an end of a data block list is reached.

At step 1044, the block with the least number of active data blocks is marked as empty.

At step 1046, processing loops until there is a 100% or substantially empty block. Processing loops at step 1048 and finds a block with fewest active data blocks. If a 100% or substantially empty block is found, processing returns to other computing.

The methods described above exist principally to optimize performance that is strongly oriented towards random I/O such as a server computer would generate. The above-described methods may be embodied as an integrated CPU 1108 on a device to manage multiple devices in servers. However, the methods described above can also be used beneficially in a smaller memory disk.

When the above-described method is loaded as a driver onto a laptop, PDA, or other similar device, then a small flash drive can be optimized using the present method to write faster and fail less frequently. This would have an impact on many applications, including saving mail, such as Outlook®, and caching web pages.

With the above preamble in mind, various improvements over the prior inventions described hereinabove are now described in further detail. These advancements are the result of further research and developments in this field by Applicant, and the various and improved embodiments and supportive information set forth hereinbelow exemplify the present invention. One such new paradigm and mechanism involves the so-called Wildfire Enterprise Storage Stack (ESS).

Inherent in the description hereinabove, which is made clearer in the description hereinbelow, is the problem of component wear, and the various manners that that wear may be amplified in usage, which constitutes a serious problem for numerous electronic components managing memory and data storage. Applicant's ongoing research and development in the aforesaid wear reduction area resulted in the further improvements set forth hereinbelow in more detail.

Indeed, the wear reduction mechanisms used by Applicant's WildFire Enterprise Storage Stack (ESS) are significantly different from those used in most basic storage and enterprise environments, and represent a leap over current technologies. As discussed, most systems of flash management aim at keeping the data in logical order as much as possible in order to maximize read performance, and to minimize the logic required to manage Flash access and update. The simplest way to achieve this is to treat each erase block as a combination of linear range data together with free blocks at the tail end of the erase block which can be used to sequentially post any changes.

Figure 12:
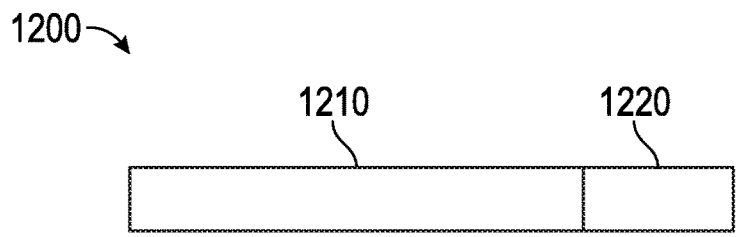
FIG. 12 shows a typical consumer flash layout of an erase block having 128 4K blocks.

With reference now to FIG. 12 of the DRAWINGS, there is illustrated therein a typical consumer Flash layout for an erase block, generally designated by the reference numeral 1200. As shown, erase block 1200 in this standard embodiment has two components, a sequential data block portion, generally designated by the reference numeral 1210, and an update portion, generally designated by the reference numeral 1220. In this embodiment the erase block 1200 has a total of 128 4 KB data blocks, of which 116 are the sequential data blocks 1210, and 12 are the updates 1220. It should, of course, be understood that the particular numbers employed in this example and hereinbelow are exemplary only, but at the present time cover a main embodiment of use of the technologies involved.

It should be understood that each of the 12 4 KB updates 1220 is filled in one after the other, e.g., in accordance with Flash Program/Erase (PE) update rules. When all 12 updates are in place, and a 13th comes along, an update 1220 will then incorporate the 12+1 into the 116 sequential blocks 1210, thereby producing a theoretical wear amplification of 128/13 or 9.84:1 wear amplification, which is the wear among the most common range of updates. Similarly, if one were to increase free space, e.g., to approximately 30% of all space, one might end up with an example like that in the next Figure.

Figure 13:
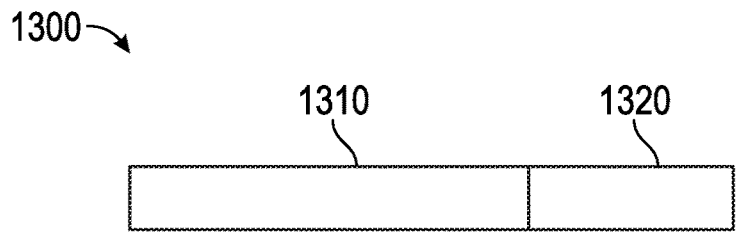
FIG. 13 shows an alternative consumer flash layout of an erase block having 128 4K blocks.

With reference now to FIG. 13 of the DRAWINGS, there is illustrated therein an alternative layout than that shown in FIG. 12, i.e., an Enterprise Flash layout, generally designated by the reference numeral 1300, which creates more storage for the updates. As shown, erase block 1300 in this embodiment also has two components, a sequential data block portion, generally designated by the reference numeral 1310, and an update portion, generally designated by the reference numeral 1320. In this embodiment, however, the erase block 1300 has the aforementioned 128 4 KB data blocks arrayed differently, i.e., 90 are the sequential data blocks 1310, and 38 are the updates 1320, whereby the storage for updates is increased at the expense of the sequential data storage, as is understood in the art.

It should, of course, be understood that in this embodiment 38+1 updates must occur sequentially before a PE cycle occurs. In such an example and pursuant to the present invention, wear amplification will be reduced to 128/39, or 3.28:1. It should, therefore, be understood that setting aside more free space obviously reduces wear in a significant way, but this reallocation also increases the cost of each unit of usable flash by 29% vis-à-vis the aforementioned example described in connection with FIG. 12.

It should be understood that in describing this typical Flash Translation Layer (FTL) model, the purpose here is not to explain exactly how most Flash FTLs actually work, for there are many variants on this basic theme, but to invite one to realize that FTLs are commonly built using some analog of the above, and that common FTL features, such as trim( ) support, described in more detail hereinbelow, can function within the scope of this basic design.

The aforementioned WildFire ESS FTL, as set forth in the patents listed in the cross-reference portion hereinabove and herein, works in a different way. Instead of associating a particular range of logical data blocks with a particular Program/Erase (PE) block or block-set, and preparing that group for the acceptance without PE cycle of further random writes, ESS writes all incoming and changing data in time-order received to an empty write block, which consists of one PE block or a group of related PE blocks, as is known in the art.

It should be understood that this target write block can be the length of a single PE block, or it can be multiple lengths, such as a linear set of PE blocks in a single storage device. It can also be a further multiple targeting a particular RAID format, such as a set of Solid State Devices (SSDs) configured to RAID-0, RAID-5, RAID-6 or other devices, as is understood in the art. It should further be understood that the use of multiple PE blocks, rather than single PE blocks, can be advantageous in reducing mount times and in reducing wear.

Figure 14:
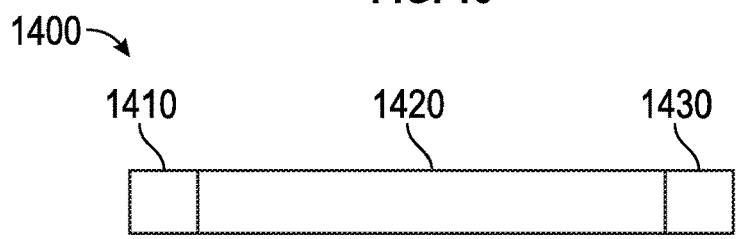
FIG. 14 shows a preferred consumer flash layout of an erase block having 128 4K blocks pursuant to the principles of the present invention.

With reference now to FIG. 14, there is illustrated an embodiment of an ESS Write Block pursuant to the teachings of the present invention, generally designated by the reference numeral 1400, which has a header portion 1410, a data block portion 1420 and a footer portion 1430, and which in this embodiment consists of n 4K data blocks, i.e., an integer multiple of 4K. As discussed, all writes to the target write block 1400 are atomic, i.e., each write chunk must consist of one or multiple data blocks 1420, together with a header 1410 and a footer 1420, which collectively hold all the control information, including time stamps, the data-related metadata defining the datum's exact physical and logical position, as well as state references of each data element present in the write chunk, as also described hereinabove in connection with FIGS. 1-11.

It should be understood that the actual size of a chunk written can be less than a whole write block 1400 provided that each chunk is written sequentially, and provided that the sum of all chunks matches the size of the write block. For instance, in enterprise usage with multiple SSDs, it is common to write chunks which are exactly one RAID stripe in size even though the target write block may be many megabytes long. Similarly, segmentation into multiple chunks may occur in order to create a timeout mechanism to force physical writes, or to cut an inconveniently large PE block into smaller pieces in order to reduce RAM footprint. As write activity increases, chunk size will increase to improve write efficiency, up to the point where chunks are the same size as write blocks.

Write activity is mirrored in the controller device and memory, such as shown and described in connection with FIG. 11, where RAM tables keep track of the present physical location and state of each individual logical 4 KB block addressable by the system.

The ESS structure of the present invention has two primary advantages. First, because all data and control information is written in a sequential manner from beginning to end of PE blocks, and sequential writing is normally faster, ESS writes very quickly, at speeds that are often 10 times faster than the random write speed of the target device. Second, because ESS writes all change in a single linear stream it inherently reduces wear and has ways of reducing wear which are not available to standard structures, such as discussed in more detail hereinbelow.

Baseline Wear Amplification

While it is generally true that basic wear amplification is a function of the ratio between free space and all storage space, it is not a given that the ratio will be constant. For instance, in the example shown hereinabove in connection with FIG. 12, wear amplification with approximately 10.34% free space resulted in a wear amplification of 9.84:1. Indeed, one would not need to test the result in this case to determine wear, because the model used prevents other outcomes and is precisely computable.

However, the wear amplification of ESS relies upon a different set of assumptions than those described in the prior art such as set forth hereinabove. Instead of tying free space with a specific pool of PE blocks, ESS makes all free space globally usable for storage because the RAM memory table includes the physical location where each logical block is currently stored. Similarly, because ESS always writes updates to a new empty physical space, the overwriting of an existing 4 KB block with new contents results in a write of data to a new physical location together with a de facto increase of recoverable free space in existing, previously written blocks. Assuming pure random writing, no matter what the distribution, all existing write blocks empty at a continuous rate, and the most empty of these are used to recover free space.

Figure 15:
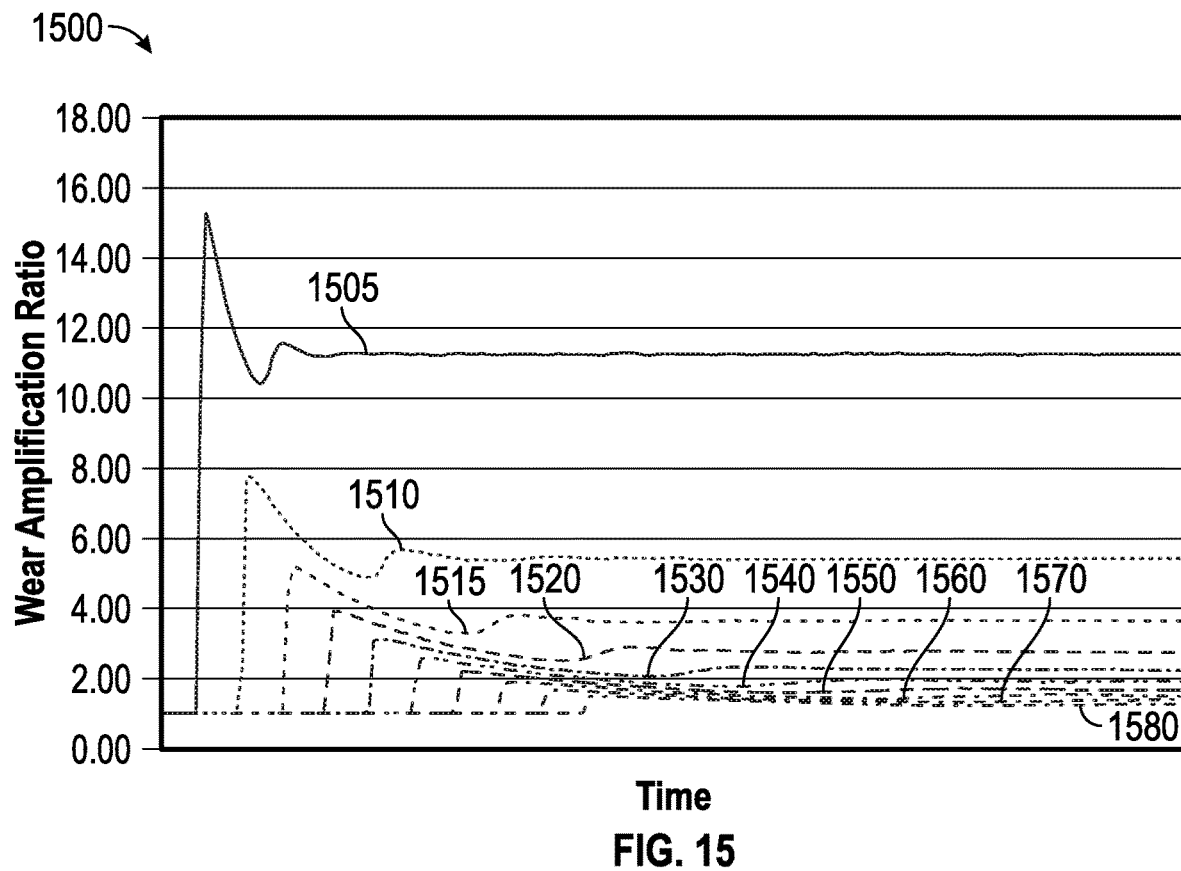
FIG. 15 illustrates a simulator wear amplification graph, using a Monte Carlo-type simulation, of component wear amplification over time at different percentages of free space.

With reference now to FIG. 15 of the DRAWINGS, there is shown therein a Simulator Wear Amplification graph, generally designated by the reference numeral 1500, illustrating the results of Monte Carlo Simulations of how ESS generates and manages wear amplification over time at different percentages of free space. This simulation has been shown to be accurate to 1% with both manufactured random data and piped traces. As demonstrated in FIG. 15, over time, wear amplification of an ESS device with 10% free space, generally designated by the reference numeral 1510, stabilizes at about 5.65:1, which is about half the wear amplification of a device using the model in FIG. 12, the curve for which is generally designated by the reference numeral 1505 (corresponding to 95% free space). It also shows that in the ESS environment, halving free space generally doubles wear amplification, while doubling free space halves wear. Further reductions in wear amplification, generally designated by the reference numerals 1510, 1515, 1520, 1530, 1540, 1550, 1560, 1570 and 1580, are also illustrated, which correspond to 90%, 85%, 80%, 75%, 70%, 65%, 60%, 55% and 50% free space, respectively.

As shown in FIG. 15, the simulations exhibit a double-hop pattern. Among other things, this FIGURE demonstrates that the ESS mechanism hits evenly-distributed free space at one very brief point, while then settling into its own mechanism. However, as the device continues to write new perfectly full write blocks, the remaining blocks are continuously emptied at a constant rate. At the point of harvesting of the most-empty block, in each case, the amount of free space in the harvested block reaches an emptiness double the average free space and, as such, cuts the wear amplification by 50%, as compared to curve 1505 for example. This is the worst case based upon smooth and random distribution. In environments where chaos is created by stable patterns, such as with repeated updates to the same logical block, free space will surge above the 2× mean because chaos can only increase the emptying of some blocks, and only the most-empty block will be defragmented in each case.

Figure 16:
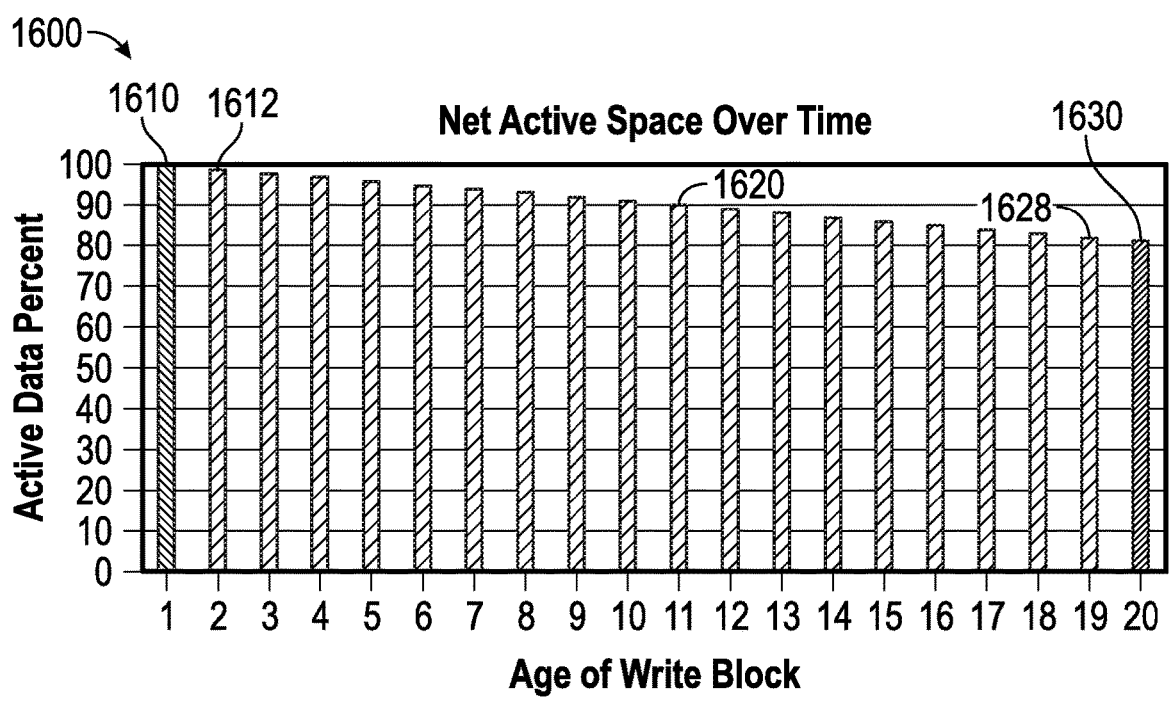
FIG. 16 is a graphical representation of usable free space versus wear pursuant to the teachings of the present invention.

With reference now to FIG. 16 of the DRAWINGS, there is shown a graphical representation of EES Usable Free Space and Wear, generally designated by the reference numeral 1600. As shown, there are twenty bars, with bars 1 and 2 at the left, generally designated by the reference numerals 1610 and 1612, respectively. Bar 1610 in this example has zero percent free space, and bar 20 at the right, generally designated by the reference numeral 1630, has 20% free space. It should be understood that the gradation of bars represents net activity over time and thus aging. Traditional FTLs with 10% free space generally write updated PE blocks which are 90% full of active data and have 10% free for the collection of changes. Thus, one can say that for all PE blocks such a device will have a wear amplification of about 10:1 and that all will be similar to block 11 in the middle, generally designated by the reference numeral 1620.

ESS, however, inverts this and writes PE blocks that are 100% full of active data, as represented by bar 1610. As additional blocks are written with new active data, they deactivate individual segments of data. In a purely random write environment, these deactivations will evenly distribute across all existing elements. Over time, the total size of each previously written block will shrink consistent with the sum of all free space (i.e., 10%) but the oldest (bar 1630) will have shrunk 19 times more than the most newly-aged element (bar 1612) because bar 1630 has had longer to age. The most empty is therefore harvested at a point that is approximately twice as empty as the average block (i.e., the middle bar 1620).

It should also be understood that this condition is repetitive. Once the last block 1630 is harvested and a new block 1610 is added, what is currently the next-to-last block (bar 1628) will have the emptiness of what is currently block 1630.

The Impact of ESS Metadata on Wear

Pursuant to the present invention, ESS generates a minimum of three 4 KB blocks of metadata per write block, which includes the data, a header, and a footer, as described hereinabove. The necessity of metadata blocks skews reported baseline wear. Without the presence of any metadata blocks, baseline wear at 10% free space reported by Applicant's Monte Carlo simulator would be near 5.00:1 instead of the 5.65:1 reported. Indeed, the 5.65:1 applies only in the condition where the write block is 1 MB in size. When the write block size is increased to 4 MB, wear falls to 5.46:1, and when it is reduced to 512 KB wear worsens to 6.35:1. Enterprise servers using Applicant's technology can have write blocks which are tens of megabytes in size and come even closer to 5:1—typically to about 5.3:1. In explaining wear, it is thus important to account separately for metadata-related wear.

Inactive Storage

It should be understood that some storage is written once but never changes, and is thus inactive. Examples of such data would include programming and operating system files, configuration files, and image files such as sound, picture and video files. In most environments where these might be used together with flash storage, Applicant has learned that such static images can easily consume about 20% to 30% of the data stored in the environment. The primary 128 GB Joint Electron Device Engineering Council (now the JEDEC Solid State Technology Association) trace for testing consumer SSDs—a trace actually generated from 8 months of activity by a single individual—actually contains more than 60% static data.

In a model where free space is locally coupled with individual PE blocks, or local zones of PE blocks, Applicant has found that the existence of static blocks does not change overall wear amplification rates because the free space coupled with these cold zones cannot be re-deployed to reduce wear in the hot zones.

With ESS, however, each new write results in the freeing of an old physical block somewhere among the active blocks. As there is a smaller number of active blocks, each of the active blocks has a higher rate of emptying than would otherwise occur, and thus there is less wear amplification per unit of overall storage.

Figure 17:
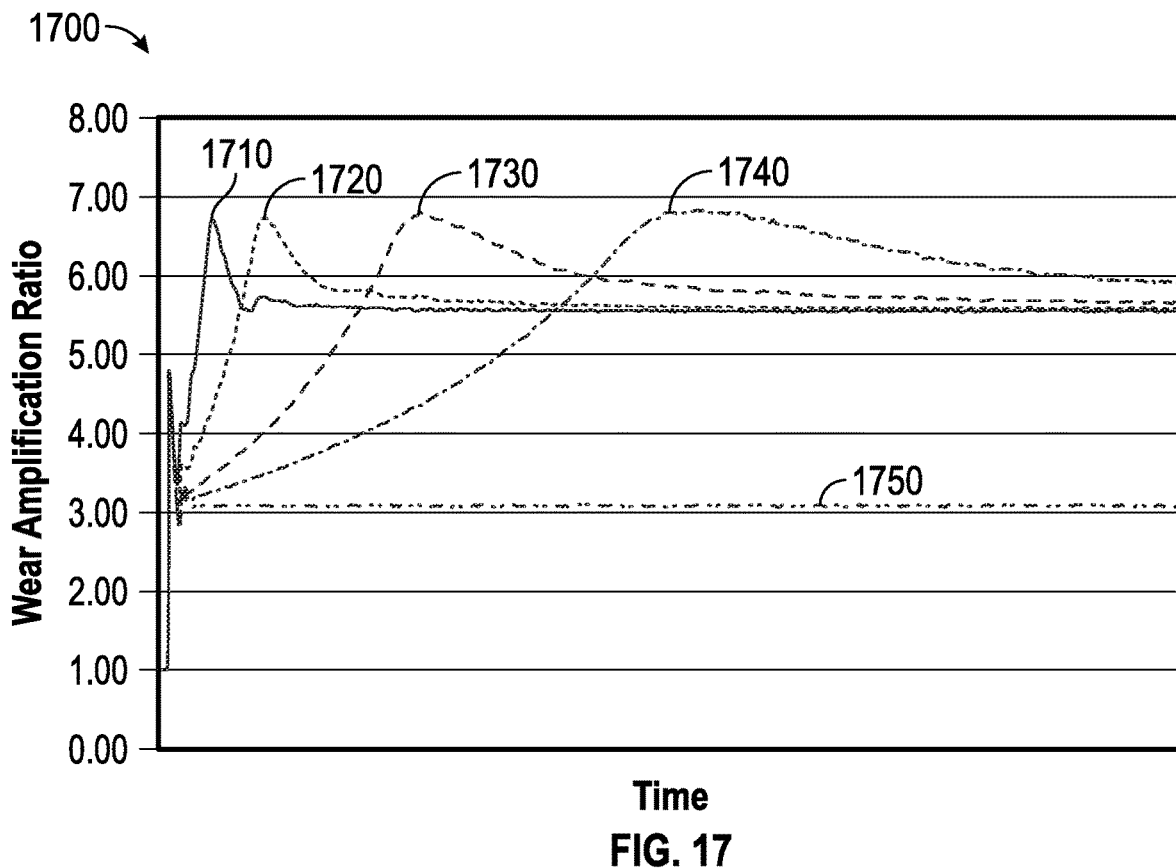
FIG. 17 illustrates an alternate simulator wear amplification graph of component wear amplification over time at different percentages of free space pursuant to the principles of the present invention.

With reference now to FIG. 17 of the DRAWINGS, there is shown therein another Simulator Wear Amplification chart, generally designated by the reference numeral 1700. The illustration demonstrates the above by showing what happens when write activity is applied with different levels of relative activity when free space represents 10% of all available space. For instance, the 50% line (corresponding to 90%), generally designated by the reference numeral 1710, shows the overall wear when writes are evenly distributed 50/50 between two separate zones. The other lines 1720, 1730 and 1740, corresponding to 95%, 98% and 99%, respectively, show that even if the ratio changes radically, all that changes is the frequency of the distribution wave. Thus, in practice, distribution occurs but takes longer to play out to stability.

However, there is an exception when 100% of writes happens to only half of the storage: wear is then only applied against a half of the available storage space, and overall wear falls from 100/10 to 55/10, reducing wear from the 5.65:1 level to about 3.05:1. This is illustrated in FIG. 17 by the curve 1750.

This is important because even small amounts of static storage—say 20%—will multiplicatively reduce overall wear by a near like percentage. In the example below, 20% static space would knock wear amplification of 5.65 down to approximately 4.49:1. As important, this reduction is applied at the write block level. Thus, if the write block is the size of one PE block, a static zone of only 512 KB would reduce overall wear by its own proportion.

Once a baseline of activity has been achieved, it is possible to increase the amount of static space, and thus the proportional free space for active elements, by using time stamps to coagulate inactive individual 4 KB blocks into perfectly full and likely static write blocks.

Figure 18:
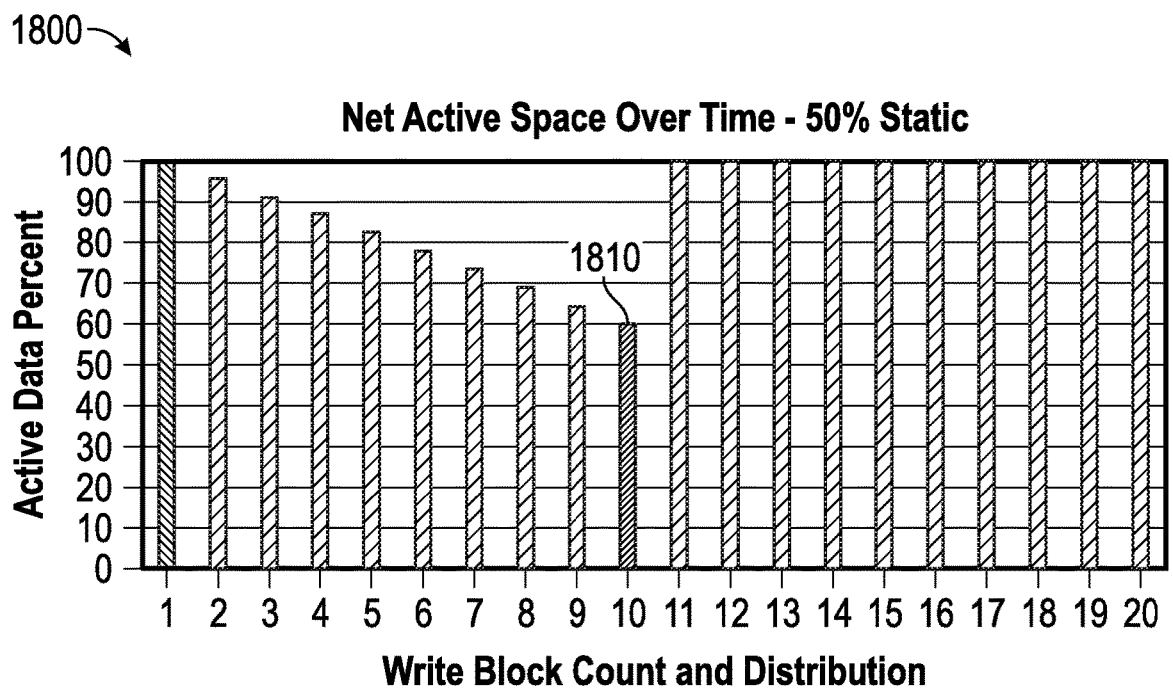
FIG. 18 is an alternate graphical representation of usable free space versus wear pursuant to the teachings of the present invention

With reference now to FIG. 18 of the DRAWINGS, there is shown another graph, generally designated by the reference numeral 1800, of what happens when 50% of the space is static and 10% of all space is free space. Under these circumstances, the free space in the active zone doubles to 20% and aging extends over only half the twenty cells, e.g., the bars 11-20 in the Figure do not age. As a result, the free space in the harvestable block, e.g., bars 1-10, at the time of harvesting the middle cell, generally designated by the reference numeral 1810, increases to 40% and remains so.
Trim( ) and Dynamic Free Space ESS stores any space that has null data content, or that has content which is all HEX00 or all HEXFF as virtual space instead of real space. Accordingly, both primary memory and the metadata (see FIG. 14) contain references to the logical block, including its state as a virtualized block, but no data from the block is stored in the data section.

Accordingly, the individual write block describes more logical blocks than it otherwise could, while consuming no more space in practical terms. This design approach results in gains in at least three areas:

First, ESS fully supports trim( ). This is important in consumer products as most client devices, including Windows and Linux client devices, support trim( ) at the client level. It is obviously less important at the Enterprise level as many enterprise usages such as SANs and iSCSI do not yet support trim( ). Trimmed space becomes part of the dynamic free space pool and thus reduces average wear. Trim( ), where supported, will often halve wear amplification by itself, when managed by ESS.

Second, to the extent that the storage media stores less data than the physical storage, the unused storage also becomes dynamic free space, reducing wear also. Space which is consumed and then deleted at the client level without notice to the storage device can also be recovered by creating a series of files which contain all-zeros (HEX00) and then deleting the same.

Third, to the extent that functions such as compression are used without expansion of the logical space, any compression which occurs also results in increased free space and reduced defragmentation, as will be discussed below.

Even small gains in free space can make major differences in wear. For instance, if one maintains 10% mandatory free space together with 5% dynamic free space through all means, then (as indicated by the "Simulator Wear Amplification" table above), one would have total free space equal to about 15%, and wear amplification would fall from 5.65:1 to about 3.8:1. Similarly, as will be discussed in the compression section, a compression level of only 5% with no increase in logical space would have the same impact on total free space.
Time-Based Wear Avoidance The "Baseline Wear Amplification" section, above, discusses how each new write to empty write blocks concurrently results in reducing the amount of space which has to be defragmented when the old block referencing the same logical id becomes a defragmentation candidate.

Under typical random write circumstances such as are prescribed by the JEDEC enterprise SSD test protocols, it is quite unlikely that an update to a specific logical block will be followed by another update to the same logical block before the whole is converted into wear amplification as part of a defragmentation process.

However, in practice, there tends to be a great deal of repetitive writing to some files. Those who use journal file systems will find that about 40% of all writes will be made to the journal, and a further 15% are likely to be written as metadata to file control blocks. In both cases, there are very high levels of updates to the same logical blocks, with overwrites of the same block occurring every 50 megabytes or so. Given that the rewrite rate to individual logical blocks is likely to be a small fraction of the free space, it will almost always be true that such blocks are never passed to the defragmentation process except as previously freed space. Similarly, there will be other rapid updates of regular data elements before a transaction is completed.

This can have a profound impact on wear. Intuitively, if more than 50% of all writes are never defragmented, this inherently reduces wear amplification by at least half. But the wear reduction is more profound than this. For instance, if there are 12 non-defragmenting writes and a further single defragmented write to an individual block, then average wear would fall to ((5.64−1)+12)/13+1=2.28:1. Similarly, standard Flash FTLs, as presented in FIGS. 12 and 13 hereinabove, cannot take advantage of time-based wear avoidance.
RAID-Based Data Reduction To the extent that data written to a RAID-5 or RAID-6 drive set is written as a full stripe, instead of being written randomly, the amount of data is reduced from a 2× multiple in the case of RAID-5 (and 3× in the case of RAID-6), to the ratio between the parity drive(s) and the sum of data drives present. For instance, a 24 drive set written to RAID-6 as full stripes will have data amplification of only 24/22 or 1.09:1. ESS supports such data reduction due to its inherent linear writing method. This method is useful in two areas. The first is in system level FTLs. The second is in reducing the wear associated with micro-striping in individual devices where RAID is used to enhance overall media reliability, as is understood in the art.

Compression and Wear Reduction

Commonly, compression is used to increase the logical space available to a user. But with ESS, it can be used another way: to radically increase free space. ESS, unlike other compression implementations, focuses solely on compression of 4 KB blocks, and can compact these into strings of blocks, even crossing 4 KB boundaries.

Normally, data is not all that compressible: only 20% or 30%. But what can be compressed becomes dynamic free space, and a 20% gain in free space comes close to halving wear yet again.

Read Performance

Individuals looking at wear reduction may be impressed with wear gains but be concerned about read performance. Here, there are two answers: minor and major, discussed hereinbelow in more detail.

First, clarity is needed: absolute read performance with ESS will probably decline 4% to 6% versus those devices run with native IO software. ESS methods preserve linearity but do not maintain locality, i.e., wear leveling also changes locality. But, the need to fetch actual logical block locations from active (RAM) memory slows down the read process slightly.

Second, the more important fact is that ESS radically improves effective read performance through enhancement of write performance. Consider the performance of a device, such as one shown in FIG. 11, that performs 10,000 random 4 KB random reads a second, but only 1,000 random writes. Given a 70% read, 30% write mix, the device would only deliver about 1,900 combined Input/Output Operations per second (IOPS), and only 1,330 reads per second because 867 milliseconds per second are needed to perform the 30% random writes required.

Then consider the same read performance matched with write performance capable of doing 20,000 random 4 KB writes a second. In the second example, overall performance would be 11,765 IOPS, and random read IOPS would actually exceed 8,230. Overall, practical read performance would increase 6.2 times. High performance reading is useless if write performance is so poor that little time is available to perform the random reads requested.

Worst Case Write Performance

Many flash devices go into the weeds when they are forced into garbage collection mode. ESS managed devices, however, generally do not. The reason is simple. Lower wear amplification means that there are fewer internal reads and writes which need to be performed to collect clean free space write blocks. As shown in detail hereinabove, the reduction of internal reads and writes results in significantly higher worst case random and linear write rates.

A Summary of Expectations

In a client or consumer use of ESS, wear amplification will typically be reduced to near 1.2:1, provided that compression is not employed. This conclusion is based both upon use of a JEDEC 128 GB Windows Client trace run against both actual media and the Monte Carlo simulation described hereinabove with 10% mandatory free space. In the following list, Applicant analyzed the impact of each function in the JEDEC 128 GB trace by working back from hard tested numbers: trim( ) support with wear of 1.2:1 and wear without trim( ) at 1.4:1. Applicant similarly determined static space to be 62% through a bitmap of all writes and determined the impact of wear avoidance by computing the difference. It should be understood that in a Journal file system, wear reduction will almost always exceed 50% due to the journal effects. Then, the question becomes the degree of repetitive data hits.

By way of a summary, below are various functions with the associated factors and wear multipliers associated therewith:

| Function | Factor | Wear Multiplier |
| --- | --- | --- |
| Baseline wear, based upon 1 MB write block | 5.65 | 5.65:1 |
| 62% set aside for static space | 0.43 | 3.00:1 |
| 80% journal, metadata/data time-based wear avoidance | 0.20 | 1.40:1 |
| 10% dynamic free space created through trim( ) | 0.50 | 1.20:1 |
| Increases total free space by 50% | | |

The same conclusions will apply, perhaps with somewhat less effect, to Android devices. Many such devices will have lots of static space, though perhaps less than Windows, due to typically smaller total storage size. Wear avoidance through repetitive writes both due to the behavior of journals and the inherent function of databases will be common. Additionally, trim( ) is supported in Android.

Predicting benefits in enterprise environments is harder. Applicant has seen many Enterprise devices over the years with wear levels that are around 1.3:1. Clearly, these systems will have baseline wear of around 5.3:1 due to the large write block size used in multi-SSD servers. Also, clearly, the elements of static space, repeated rapid overwrites of data, and dynamic free space will have a significant impact, even if trim( ) support is less than universal. But other enterprise environments will have higher wear amplification levels because the way they manage data cannot take advantage of dynamic free space, wear avoidance, or static space.

Other Potential Areas of Gain Using the Principles of the Present Invention

The above are behaviors which can be easily incorporated into a Flash or other data storage device without reference to the internal workings of the device using an "external" controller, whether this controller is an ARM on the individual device or a system level controller. Additional gains are possible if software incorporating the present invention has direct access to the internal workings of the Flash module:

First, flash memory set aside in the device for wear reduction can be incorporated into the ESS pool, either increasing wear reduction, or increasing the amount of Flash available to users.

Second, flash memory set aside for wear leveling can be used as part of the general pool of resources and handled by the main process in passing as the ESS approach operates only on whole PE blocks anyway.

Third, it may be possible to use part of the metadata associated with each particular Flash block to reduce the amount of metadata which ESS writes with each write block.

Fourth, as was previously pointed out, ESS can support the concept of building additional perfectly full write blocks by analyzing the age of each logical block and separating "old" blocks into their own write blocks.

As shown throughout the text, the advantages of the present invention allow devices employing the improved techniques of the invention to last longer through a mechanism not shown or suggested in prior devices. As shown and described hereinabove, write blocks are recycled, i.e., employed with the data and associated metadata structured within a write block. Over time, as the write blocks become stale, they are invalidated and reused, with the earlier logically-arranged data thereon being overwritten, automatically emptied. Pursuant to the findings of Applicant, the importance of writing full blocks in the process described is that when these are later emptied, there is no physical constraint to the rate/amount of such emptying. Instead, with a global pool of all write blocks on the device, the advantages of the present invention become manifest. Each of the reusable-write blocks empties as its logical content becomes stale through writing new versions of various logical blocks, and the "most empty" is the item first selected for harvesting as the newest write block.

This paradigm of operation has a dramatic consequential outcome: the operational wear of devices employing the technology of the present invention is very often increased, sometimes substantially. As is known in the art, storage devices generally have a rather limited lifespan, i.e., the devices through use wear out due to physical actions, such as a USB device being reinserted hundreds of times. The instant invention minimizes or eliminates many of the physical actions that are deleterious in operation of such storage devices. As discussed, through the employment of the rolling write blocks of the present invention, a supply of recyclable write blocks, there are little or no physical operational wear constraints, as is rife in other such devices on the market.

Applicant, through their experimentations, have determined that the principles of the present invention can have a dramatic effect on the lifetime of a device normally subject to a more limited operational lifetime. For example, a wear amplification factor (or wear lifetime factor) associated with this feature indicates the degree of the longevity of a device employing the various improvements of the present invention. A wear amplification factor of 2 means that the device lasts twice as long as a comparable device not employing the aforementioned features of the present invention, i.e., the wear lifetime factor is 2 times or at least two times more than the wear lifetime factor of an equivalent or substantially equivalent prior art or standard device not incorporating the advantages of the instant invention.

As shown throughout the text, the advantages of the present invention may result in a greater than 2 wear application factor possible under some circumstances in devices employing the principles of the present invention, as shown and described hereinabove. Indeed, wear amplification factors of greater than 3, 4, 5, 9 and even 10 have been shown and described herein. Thus, wear amplification factor ranges of 2-10 are also encompassed by the present invention, as well as other subranges therein. Further, as the principles of the present invention can be advantageously employed in a variety of situations, the wear amplification factor is greater than 10 in some instances, perhaps on the order of 15-20 times and possibly more. However, it should be understood that wear amplification factors under 2 are also encompassed herein, and that the component structural improvements of the present invention is new, novel, non-obvious and structurally superior to devise on the market, whether those devices demonstrate a wear amplification or not.

Unless otherwise provided, use of the articles "a" or "an" herein to modify a noun can be understood to include one or more than one of the modified noun.

While the systems and methods described herein have been shown and described with reference to the illustrated embodiments, those of ordinary skill in the art will recognize or be able to ascertain many equivalents to the embodiments described herein by using no more than routine experimentation. Such equivalents are encompassed by the scope of the present disclosure and the appended claims.

Accordingly, the systems and methods described herein are not to be limited to the embodiments described herein, can include practices other than those described, and are to be interpreted as broadly as allowed under prevailing law.

What is claimed is:

1. A block storage device comprising:
   pluralities of data arranged in time received order;
   respective pluralities of metadata associated with respective pluralities of said data stored contiguous with respective pluralities of said data within at least one write block;
   at least one additional write block, wherein when said pluralities of said data and associated metadata fill said at least one write block, said at least one additional write block accepts said pluralities of data and associated metadata therein; and
   looking up, from a write block table of write blocks on said device, a given write block from a number of active write blocks, wherein said write block table comprises an active block count field and a write block age field,
   whereby said given write block listed within said write block table is selected as a candidate write block for said at least one additional write block, and
   whereby, in operation, the operational wear on said block storage device is reduced, and the operational lifetime of said block storage device is at least doubled.

2. The block storage device according to claim 1, wherein said metadata comprises a control field selected from the group consisting of a signature field, an age field, a count field and combinations thereof.

3. The block storage device according to claim 1, further comprising:
   a fast lookup table, containing a plurality of logical blocks, a given logical block therein referring to a given physical block location for said at least one write block on said block storage device.

4. The block storage device according to claim 1, further comprising:
   updating a given logical block listed in a lookup table of a plurality of logical blocks based on said metadata, said given logical block referring to a given physical block location for said at least one write block on said block storage device.

5. The block storage device according to claim 1, further comprising:
   looking up, from a reverse lookup table of physical blocks on said device, a given physical block, said physical block referring to a given logical block location for said at least one write block on said block storage device.

6. The block storage device according to claim 1, wherein said selected given write block has the lowest active block count,
   whereby said linearly writing of said pluralities of data and associated metadata is performed into said at least one additional write block.

* * * * *